(12) United States Patent
Yoshioka et al.

(10) Patent No.: US 6,536,315 B1
(45) Date of Patent: Mar. 25, 2003

(54) SPINNING DEVICE

(75) Inventors: Shinichi Yoshioka, Nishikamo-gun (JP); Masakazu Tobimatsu, Amagasaki (JP)

(73) Assignees: Sango Co., Ltd., Nagoya (JP); Nihon Spindle Mfg. Co., Ltd., Amagasaki (JP)

( * ) Notice: Subject to any disclaimer, the term of this patent is extended or adjusted under 35 U.S.C. 154(b) by 16 days.

(21) Appl. No.: 09/857,944

(22) PCT Filed: Oct. 13, 2000

(86) PCT No.: PCT/JP00/07113

§ 371 (c)(1),
(2), (4) Date: Jun. 12, 2001

(87) PCT Pub. No.: WO01/26837

PCT Pub. Date: Apr. 19, 2001

(30) Foreign Application Priority Data

Oct. 13, 1999 (JP) .......................................... 11-290451
Nov. 15, 1999 (JP) .......................................... 11-324146

(51) Int. Cl.$^7$ .............................. B23B 3/00; B23B 5/00
(52) U.S. Cl. ............................... 82/64; 82/113; 82/131
(58) Field of Search ................................. 82/113, 62

(56) References Cited

U.S. PATENT DOCUMENTS

| | | | | |
|---|---|---|---|---|
| 4,573,380 A | * | 3/1986 | Bald ........................... | 82/142 |
| 4,683,788 A | * | 8/1987 | Kronawittleithner et al. .. | 82/19 |
| 4,852,434 A | * | 8/1989 | Bald ........................... | 279/135 |
| 5,217,724 A | * | 6/1993 | Lenters ........................ | 82/64 |
| 6,196,332 B1 | * | 3/2001 | Albert et al. .................. | 173/176 |
| 6,295,856 B1 | * | 10/2001 | Tobimatsu et al. ............. | 72/112 |

FOREIGN PATENT DOCUMENTS

| | | |
|---|---|---|
| JP | 11-179455 | 7/1999 |
| JP | 2000-94049 | 4/2000 |
| JP | 2000-351022 | 12/2000 |

* cited by examiner

*Primary Examiner*—William Briggs
*Assistant Examiner*—Dana Ross
(74) *Attorney, Agent, or Firm*—Wenderoth, Lind & Ponack, L.L.P.

(57) ABSTRACT

The spinning system according to the present invention performs spinning properly, by driving a working tool in revolution, on an unrotatably supported member to be machined, and also performs other work such as cutting, etc. after the spinning. For that purpose, the spinning system according to the present invention comprises a first rotor (24) provided at the tip of the outer tube (21) and a second rotor (25) provided at the tip of the inner tube (23), forms a first guide route (guide groove (25a)) and a second guide route (guide groove (25b)) on this second rotor (25), and movably supports a first working tool (roller (28)) and a second working tool (cutter blade (30)) respectively, on the first rotor (24), along those first and second guide routes, to rotatably drive the outer tube (21) and the inner tube (23) in one same direction, on an unrotatably supported member to be machined (tube material (4)), and rotatably drive them relatively, as required, in a way to produce a difference of rotation between the two.

12 Claims, 20 Drawing Sheets

F I G. 3
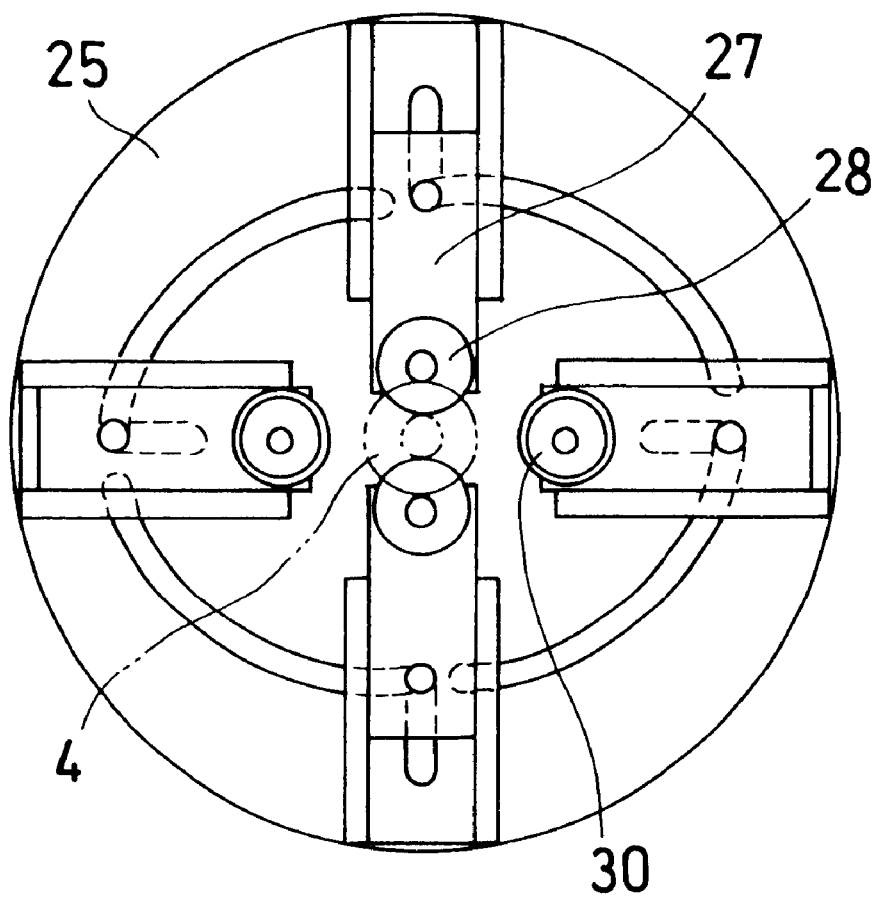

F I G. 4
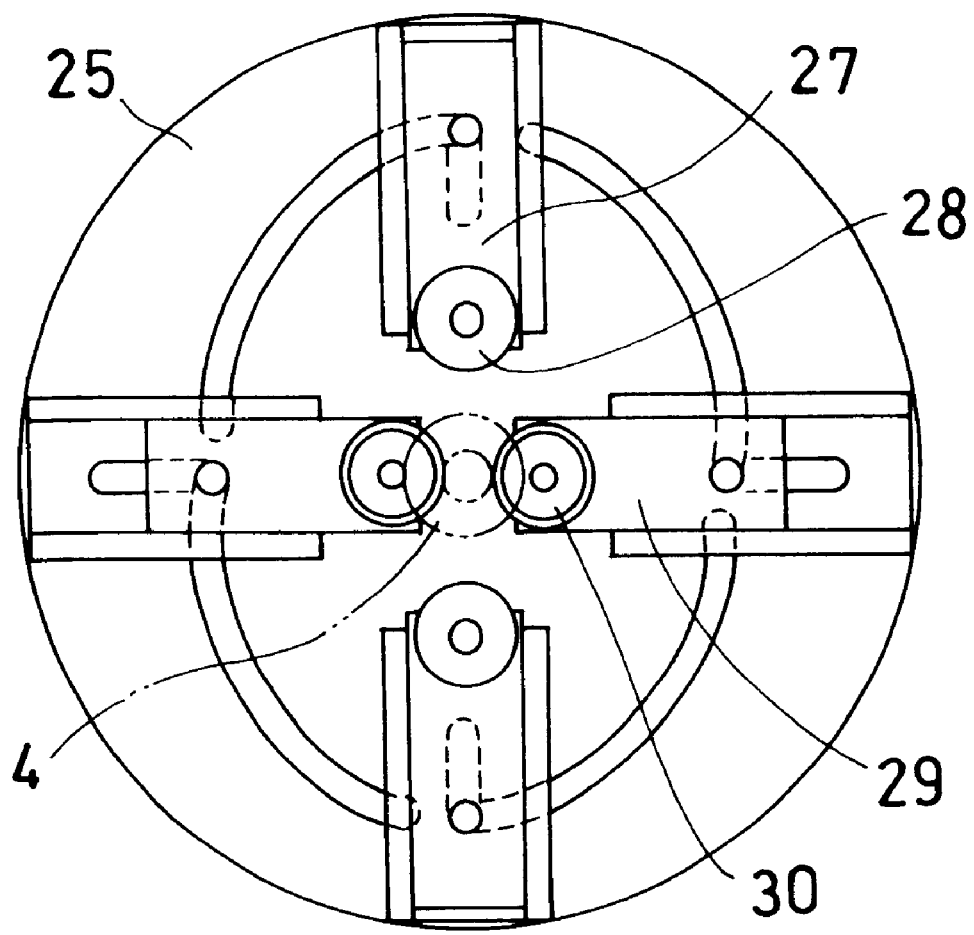

SPINNING DEVICE

TECHNICAL FIELD

The present invention relates to a spinning system, more specifically a spinning system for performing spinning, by driving rollers in revolution, on a member to be machined supported in an unrotatable state.

BACKGROUND ART

Various types of spinning system are known as spinning systems for performing spinning mainly at the end of tubular materials, such as formation of tapered tube end, for example.

Among such spinning systems, there is a system intended for performing spinning by driving a drawing tool in revolution around the member to be machined, in the state where the member to be machined is unrotatably supported, as the one disclosed in the Japanese Patent Publication No. 3-8412, for example. The spindle system indicated in that patent publication is constructed by providing a cam plate and a tool mounting base (face plate) on a main spindle of double structure, to drive 2 sets of planetary gear mechanism provided in series in the rear part of the main spindle, produce a difference of speed between the inner tube and the outer tube of the main spindle in rotation for giving a relative turning between the cam plate and the tool mounting base, and slide the drawing tool, which is revolving around the main spindle, in radial direction, to perform spinning.

Moreover, also known is a spinning system for performing spinning by combining inclined axis and eccentric axis, as required, and driving rollers, which are working tools, in revolution around the member to be machined, such as those disclosed in the Japanese Laid-open Patent Publications No. 11-147138 and No. 11-151535, for example.

In a system for performing spinning by means of a working tool revolving around the main spindle like the spindle system indicated in the Japanese Patent Publication No. 3-8412, it is difficult to perform processing by placing, side by side, a plural number of working tools such as drawing tool and cutter blade, for example, unlike a spinning system which turns the member to be machined by fixing the working tool, and this makes it necessary to cut the machined end by using a separate equipment in a separate process, after completion of the spinning work.

Such cutting process after spinning becomes essential as finishing work of tube end, especially after execution of a spinning work including inclined axis and eccentric axis as indicated in said Japanese Laid-open Patent Publications No. 11-147138, etc.

Furthermore, while it is requested, on a system for performing spinning by means of a working tool revolving around the main spindle, to enable to perform spinning continuously by using 2 different kinds of roller, for example, no such system has yet been realized.

DISCLOSURE OF THE INVENTION

In view of the above-described situation, the objective of the present invention is to provide a spinning system to perform spinning, by driving a working tool in revolution on an unrotatably supported member to be machined, capable of not only properly performing spinning but of also performing other work such as cutting, etc. after spinning.

To achieve said objective, the spinning system according to the present invention is constructed by comprising, as indicated in claim 1 below, a main spindle with a double tube having an outer and inner tube, a first rotor provided at the tip of one of said outer or inner tubes that turns together with one of the said tubes around the main spindle, a second rotor provided at the tip of the other of said outer or inner tube parallel to the first rotor and turning together with the other said outer or inner tube around the said main spindle and forming a first guide and second guide route around the axis of the other tube of the said outer or inner tube, a first and second tool supported on said first rotor, movably along the said first and second guide routes of the second rotor respectively, and a driving means for rotatably driving said outer tube and inner tube in the same direction, on an unrotatably supported member to be machined, and rotatably driving said outer and inner tubes relatively, as required, in a way to produce a difference of rotation between said outer and inner tubes, so as to drive the said first working tool in a radial direction along the said first guide route and to drive the said second working tool in a radial direction along the said second guide route, while driving both the said first and second working tools in revolution. According to the spinning system indicated in claim 1, it is possible to properly perform spinning by driving the working tools in revolution and also perform other work such as cutting, etc. after spinning, on an unrotatably supported member to be machined.

In this case, the system may be constructed in such a way that the said second working tool moves outward in a radial direction when the said first working tool moves inward in a radial direction, and that the said second working tool moves inward in a radial direction when the said first working tool moves outward in a radial direction, as indicated in claim 2. According to the spinning system indicated in claim 2, it is possible to accurately prevent any contact between the first and second working tools, and thus increase the degree of freedom in the disposition of the first and second working tools.

Moreover, for that purpose, it is possible to provide a reversing mechanism on either the said first or second working tool, as indicated in claim 3. According to the spinning system indicated in claim 3, it is possible to reverse the direction of movement of the first and second working tool, with a simple mechanism.

Furthermore, it is possible to form the prescribed length on both ends of the said first and second guide routes formed concentrically on the said second rotor, as indicated in claim 4. According to the spinning system indicated in claim 4, it is possible to use the concentrically formed portion as an escape position for either the first or second working tools.

And, on the said spinning system, it is possible to use a spinning roller as the said first working tool and a cutter blade as the said second working tool, as indicated in claim 5. By using a spinning roller as the said first working tool and a cutter blade as the said second working tool, as indicated in claim 5, it becomes possible to perform post-processing trimming after spinning.

Furthermore, on the said spinning system, it is possible to use as the said first working tool a spinning roller with a large curvature at the portion to come in contact with the said member to be machined, and use as the said second working tool a spinning roller with a small curvature at the portion to come in contact with the said member to be machined, as indicated in claim 6. Here, while the spinning roller with a large curvature at the portion to come in contact with the member to be machined is suitable for forming a rough shape, the spinning roller with a small curvature at the portion to come in contact with the member to be machined, which is capable of forming while maintaining a high face accuracy of the member to be machined, is suitable for finishing. Therefore, by providing 2 sets of rollers different in curvature at the portion to come in contact with the member to be machined as mentioned above, it becomes possible to perform general processing and finishing in succession, with high accuracy. By using, as the said first working tool, a spinning roller with a large curvature at the portion to come in contact with the said member to be machined and using, as the said second working tool, a spinning roller with a small curvature at the portion to come in contact with said member to be machined, as indicated in claim 6, it becomes possible to perform general processing and finishing in succession with high accuracy, and thus to smoothly perform spinning work.

As described above, there is a spinning roller as the said first working tool, and there are cutter blades for cutting the member to be machined, a cutting tool for treating the cut surface, a grindstone, etc. in addition to the spinning roller, as the said second working tool.

This makes it possible to smoothly perform spinning and execute, after spinning, desired work such as cutting, etc. in succession, on the said member to be machined.

The said first and second guide routes may be either grooves or protruding lines, and the first and second working tools may be driven along both the first and second guide routes respectively, by forming pins which are guided by being fastened in the groove, or by grooves which are guided by being engaged with the protruding lines. The said first and second guide routes may also be formed as a single continuous guide route.

BRIEF EXPLANATION OF THE DRAWINGS

FIG. 3 is a front elevation showing the relation between the roller and the cutter blade in the spinning system of an embodiment according to the present invention.

FIG. 4 is a front elevation showing the relation between the roller and the cutter blade in the spinning system of an embodiment according to the present invention.

PREFERRED EMBODIMENT OF THE INVENTION

Embodiments of the spinning system according to the present invention are explained hereafter with reference to drawings.

Figure 1:
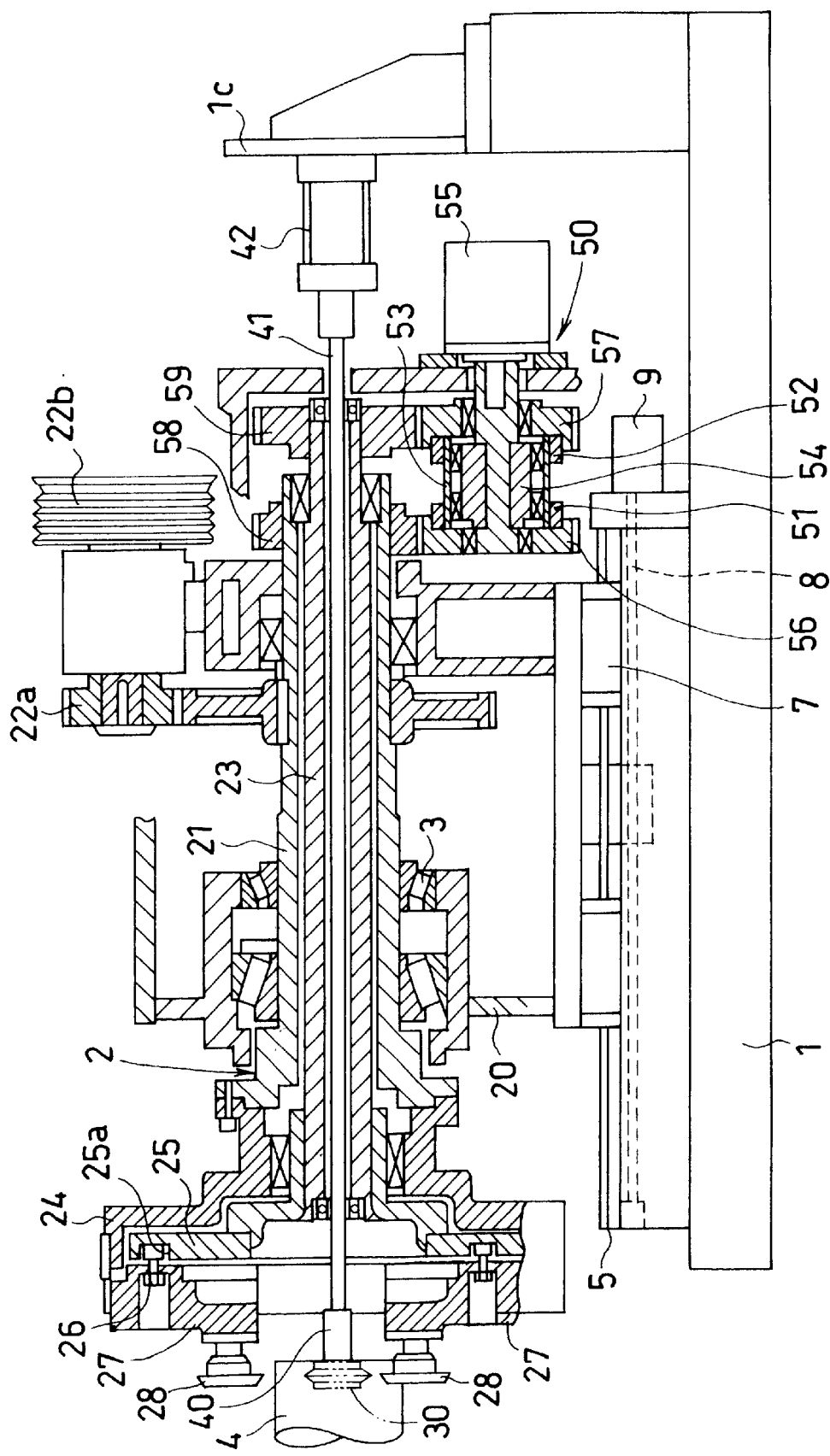
FIG. 1 is a sectional view showing a general view of the spinning system of an embodiment according to the present invention.
Figure 2:
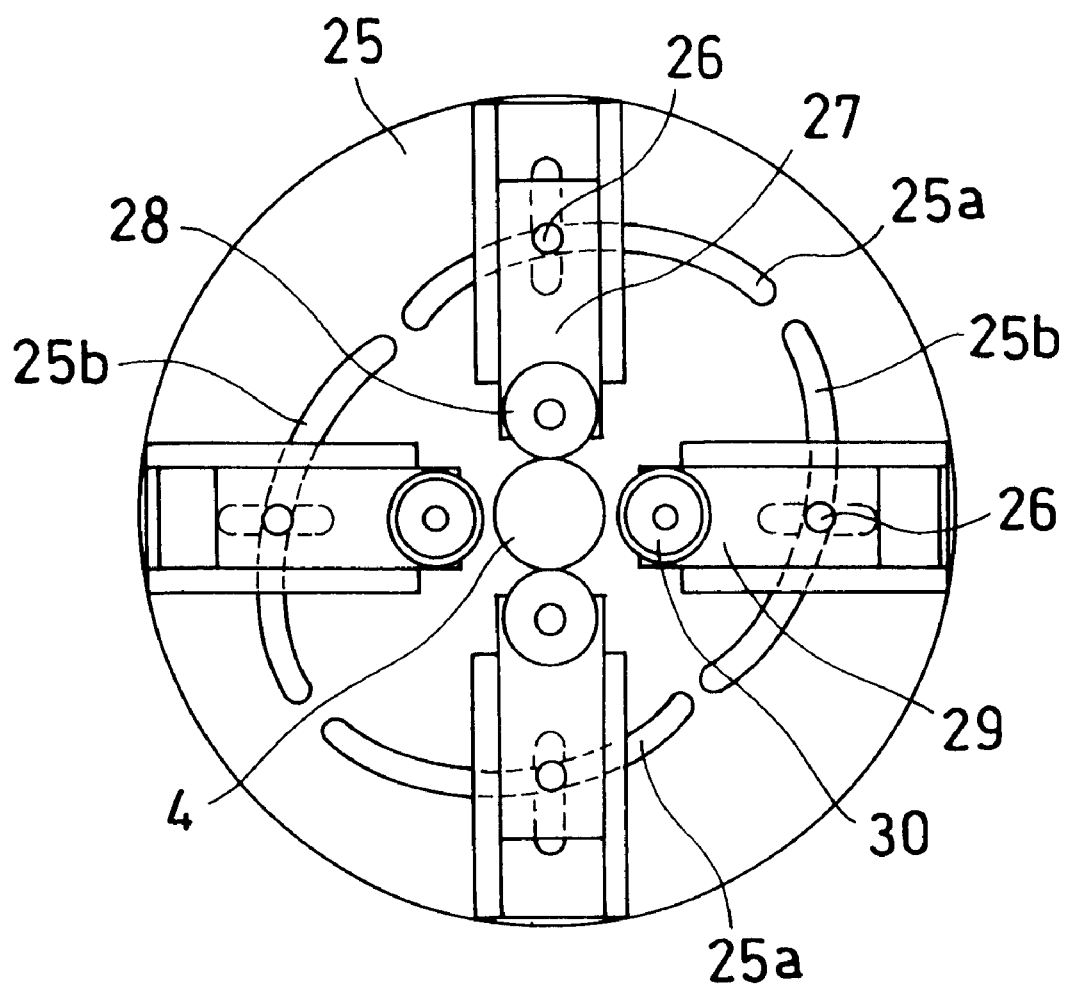
FIG. 2 is a front elevation showing the relation between the roller and the cutter blade in the spinning system of an embodiment according to the present invention.

FIG. 1 and FIG. 2 indicate the spinning system of an embodiment according to the present invention, which can work the end part of the tube material 4 in reduced diameter, for example, and the final product of this embodiment is used for outer cylinder of a silencer for automobile (not illustrated), catalyst converter and various kinds of pressure vessel. While the original material (raw material before working) in this embodiment is a metallic tube material, the type of this material is not particularly specified.

In FIG. 1 and FIG. 2, a pair of guide rails 5 are fixed on a base 1, and a case 20 is movably disposed along these guide rails 5. At the bottom of this case 20 is fixed a socket 7, and a hole screw 8 to be connected to it is disposed on the base 1 in parallel to the guide rails 5 and rotatably supported by a servo motor 9. And, they are constructed in such a way that the case 20 moves along the guide rails 5, as the hole screw 8 is rotatably driven by the servo motor 9.

And, a main spindle 2 is disposed on a plane parallel to the base 1, and is rotatably supported by the case 20 through a bearing 3, etc. around its center axis. As shown in FIG. 1, the main spindle 2 is constructed in a double tube with an outer tube 21 and an inner tube 23 in cylindrical shape, and connected to a speed change mechanism 50 to be described later.

Moreover, a connecting rod 41 of a mandrel 40 is supported in a way to move forward and backward in the axial direction independently of the main spindle, through the hollow part of the inner tube 23. Namely, the connecting rod 41 is supported in a way to float, through a bearing, against the inner tube 23 of the main spindle 2 and, therefore, constructed in a way to move in the axial direction regardless of the rotation and movement in axial direction of the main spindle 2. The mandrel 40 is constructed in a way to agree with the shape on inner side of the open end of the tube material 4. The end part of the connecting rod 41 is supported by a cylinder 42 for forward and backward drive, and the cylinder 42 is supported by the base 1 through a bracket 1c.

On the other hand, a tube material 4 is unrotatably supported by a clamping device (not illustrated), so that the target center axis for working at its end agrees with the center axis of the main spindle 2. Namely, they are constructed in such a way that the target center axis for working of the tube material 4 and the center axis of the main spindle 2 are positioned on one same plane with the base 1 (same height from the base 1).

The outer tube 21 of the main spindle 2 is formed with a member in cylindrical shape, in the hollow part of which is housed the inner tube 23 in cylindrical shape, and is connected to the speed change mechanism 50 to be described later.

Furthermore, the connecting rod 41 of the mandrel 40 is supported in a way to move forward and backward in the axial direction, through the hollow part of the inner tube 23. The mandrel 40 is formed in a way to agree with the shape on the inner side at the opening end of the tube material 4. The base end of the connecting rod 41 is supported by the cylinder 42 for forward and backward drive, and the cylinder 42 is supported by the base 1 through the bracket 1c.

The outer tube 21 is connected to a pulley 22b through a gear train 22a, and this pulley 22b is connected to a motor, etc. (not illustrated) through a belt (not illustrated), and the outer tube 21 is rotatably driven by this motor, etc.

On the other hand, to the tip of the outer tube 21 is fixed a first rotor 24, and the first rotor 24 turns around the center axis as the outer tube 21 is rotatably driven.

And, the tip of the inner tube 23 is rotatably supported on this first rotor 24. To the tip of the inner tube 23 is fixed a second rotor 25, and the second rotor 25 is rotatably driven around its center axis together with the inner tube 23.

As shown in FIG. 2, on the second rotor 25 of this embodiment are formed 4 guide grooves in circular shape constituting the first and second guide routes of the present invention (a set of guide grooves facing each other are expressed with 25a, 25b respectively), and in each of those guide grooves 25a, 25b is disposed a guide pin 26 moving in radial direction with a rotation of the second rotor 25. Those guide pins 26 are held by a pair of supporting members 27 and a pair of supporting members 29 respectively. The supporting members 27 are disposed in a way to face each other, slidably supported by the second rotor 25, and held movably along the guide groove 25a through the guide pin 26. Similarly, the supporting members 29 are also disposed in a way to face each other, slidably supported by the second rotor 25, and held movably along the guide groove 25b through the guide pin 26. And, as shown in FIG. 1 and FIG. 2, on the respective supporting members 27 are rotatably supported rollers 28, and on the respective supporting members 29 are rotatably supported cutter blades 30. In FIG. 2 (and in subsequent figures), the first rotor 24 is omitted for the sake of simplification of explanation, and only the supporting members 27, 29, the roller 28 and the cutter blade 30 to be supported by the first rotor 24 are expressed.

Said guide grooves 25a, 25b are formed in such a way that the supporting members 27 (and the roller 28) and the supporting members 29 (and the cutter blade 30) move relatively as the second rotor 25 turns in one direction. Namely, the profile of the guide grooves 25a, 25b is formed in such a way that the supporting members 29 move inward in radial direction in the case where the supporting members 27 moves outward in radial direction, and conversely the supporting members 29 move outward in radial direction in the case where the supporting members 27 moves inward in radial direction.

And, as the outer tube 21 is rotatably driven by a non-illustrated motor, etc., the respective rollers 28 and cutter blades 30 turn around the center axis of the tube material 4. In this state, as the second rotor 25 turns relatively against the first rotor 24, the supporting members 27 are driven in radial direction, the roller 28 is driven in a way to come close to and get away from the center axis of the tube material 4, the supporting members 29 are driven in radial direction opposite to the direction of movement of the supporting members 27, and the cutter blade 30 is driven in a way to come close to and get away from the center axis of the tube material 4. Namely, they get in the state indicated in FIG. 3 from the state of FIG. 2 and, during this period, while the end part of the tube material 4 is reduced in diameter by the roller 28, the cutter blade 30 remains on standby at a position away from the tube material 4.

The speed change mechanism 50, to which are connected said outer tube 21 and inner tube 23, is a differential mechanism for rotatably driving the outer tube 21 and the inner tube 23 relatively so as to produce a difference of rotation between the outer tube 21 and the inner tube 23, and constitutes part of the driving means of the present invention.

The speed change mechanism 50 of this embodiment, using a drive system with flexible biting, is provided, as shown in FIG. 1 and FIG. 11 to FIG. 13, with a pair of outer rings 51, 52 with which are engaged the outer tube 21 and the inner tube 23 respectively, a flexible gear ring 53 on which are formed teeth to bite with the same number of tooth grooves formed in the inner surface thereof but different from them in the number of teeth, and a wave forming ring 54 disposed in a way to rotatably support this gear ring 53 and bite with the tooth grooves of the outer rings 51, 52 at 2 points facing each other. This wave forming ring 54 is rotatably driven by a speed reducing motor 55 for driving. The outer rings 51, 52 are supported by supporting gears 56, 57 respectively, and a driving gear 58 biting with the supporting gear 56 is mounted on the outer tube 21, while a driven gear 59 biting with the supporting gear 57 is mounted on the inner tube 23.

Said drive system with flexible biting is provided with a differential mechanism for producing a relative difference of speed between the outer rings 51, 52 depending on the driving of the speed reducing motor 55 for driving, although explanation of its working principle is omitted here because it is known as harmonic drive (with information available on the Internet http://www.hds.co.jp/hdss.htm, for example).

And, they are so constructed that, as the outer tube 21 is rotatably driven by a non-illustrated motor, etc., the second rotor 25 is rotatably driven through the inner tube 23 by a differential motion between the outer rings 51, 52, and the supporting members 27, 29 as well as the roller 28 and the cutter blade 30 move in radial direction against the center axis of the main spindle 2.

And, they are constructed in such a way that the respective driving means such as said motors 9, 55, etc. and cylinder 42, etc. are electrically connected to a controller (not illustrated) and, from this controller, control signals are output to the respective driving means to perform numerical control. The speed change mechanism 50 is not restricted to said drive system with flexible biting, but other differential mechanism such as planetary gear mechanism, etc. may also be used.

To explain actions of the spinning system constructed as described above, in the first place, in FIG. 1, the tube material 4 is held in an unrotatable state by a clamping device (not illustrated). At that time, the tube material 4 is positioned in such a way that its center axis becomes coaxial with the center axis of the main spindle 2. Moreover, the respective rollers 28 retreat to outside from the outside diameter of the tube material 4.

Next, the case 20 is driven to advance along the guide rail 5 (moves to the left in FIG. 1), and stops at the position for starting spinning of the tube material 4 in the state where the respective rollers 28 are retreated. And, the mandrel 40 is driven to advance in a way to be positioned in the opening at an end of the tube material 4. From this state, the outer tube 21 is rotatably driven by a non-illustrated motor, etc., and the first rotor 24 turns around its center axis, while the second rotor 25 is rotatably driven through the speed change mechanism 50. And, the outer tube 21 and the inner tube 23 are rotatably driven relatively by a speed reducing motor 55 and, as a difference of rotating speed is produced between the two, and eventually between the first rotor 24 and the second rotor 25, the supporting member 27 slides in the direction of the center axis along the guide groove 25a, while the supporting member 29 slides to outside along the guide groove 25b.

Figure 5:
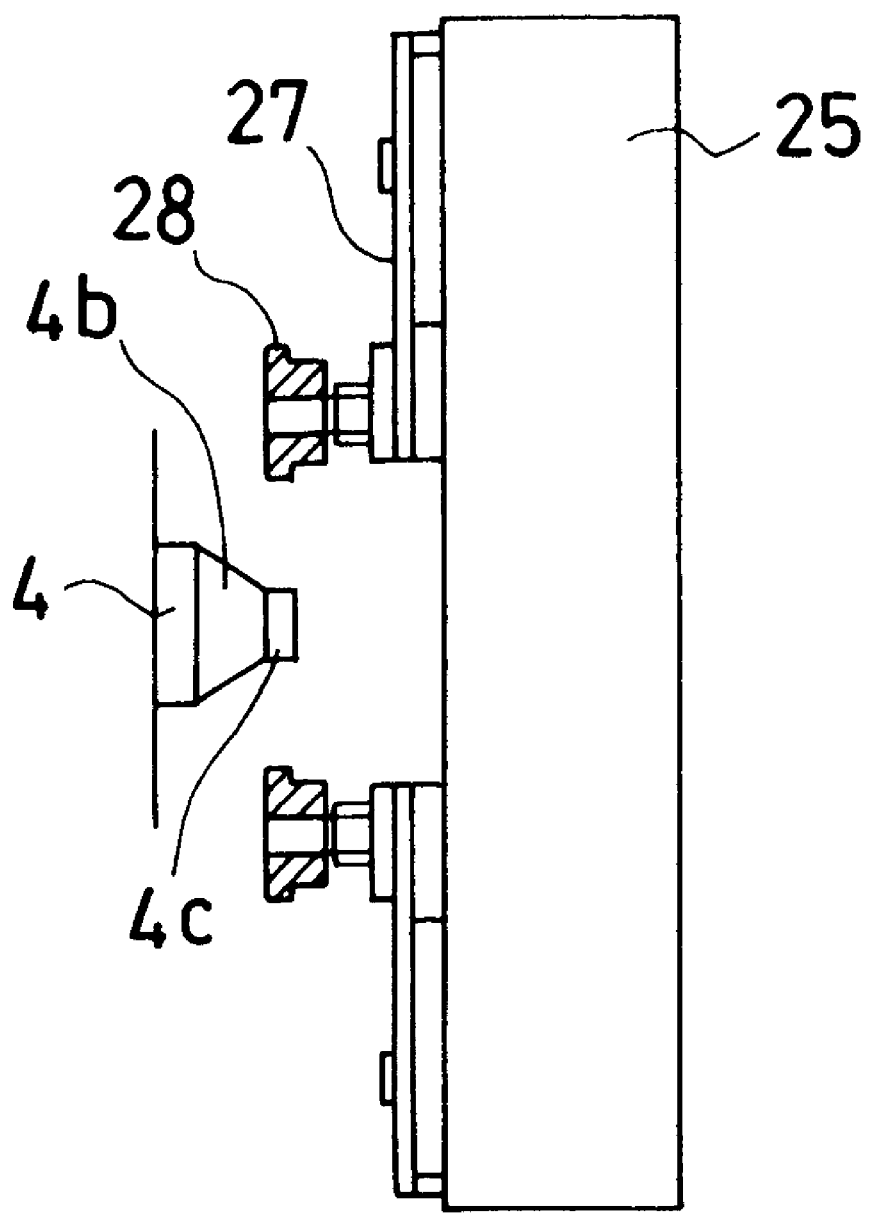
FIG. 5 is a side view of the state in FIG. 4 showing the relation between the roller and the cutter blade in the spinning system of an embodiment according to the present invention.

Consequently, the respective rollers 28 are driven in radial direction toward the target axis for working. At the same time, the case 20 is driven to retreat (moves to the right in FIG. 1), along the guide rail 5 by the motor 9, and the respective rollers 28 are driven to retreat in the same direction. As a result, the respective rollers 28 turn by themselves (namely, rotate), in the state pressed against the outer circumferential face at the end of the tube material 4, and, while turning around the target axis for working (namely, revolving), are driven in radial direction toward the target axis for working, to perform spinning as shown in FIG. 3. During this time, as the supporting member 29 slides to outside along the guide groove 25b, the respective cutter blades 30 are retreated in a position away from the tube material 4, as shown in FIG. 3. Especially, the profile of the guide grooves 25a, 25b is set in such a way that the respective cutter blades 30 slide inward in radial direction to avoid interfere with the tube material 4 even when the respective rollers 28 move outward in radial direction to the fullest extent. In the same way, a plural number of working cycles are performed, and a tapered portion 4b and a neck portion 4c of final shape as shown in FIG. 5 are formed at the end of the tube material 4.

Figure 6:
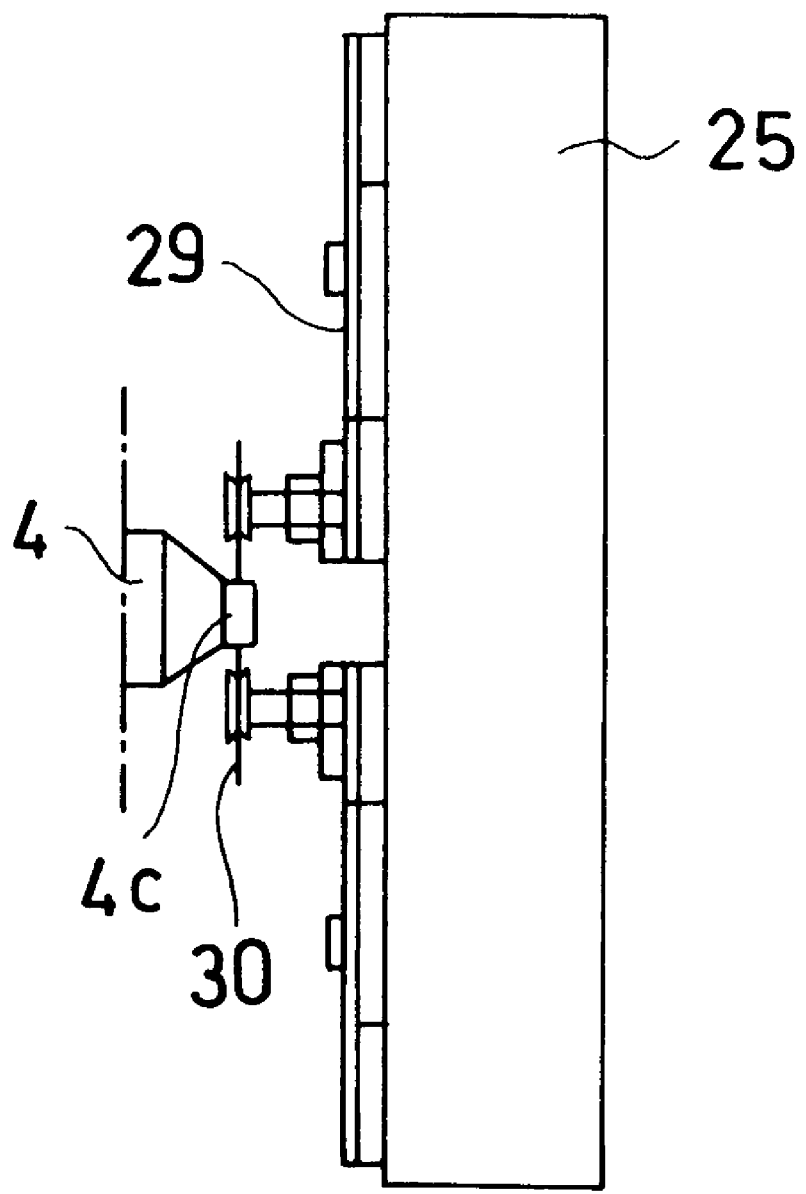
FIG. 6 is a side view of the state in FIG. 4 showing the relation between the roller and the cutter blade in the spinning system of an embodiment according to the present invention.

Next, in the case where the speed reducing motor 55 is driven in such a way that the relative direction of rotation of the inner tube 23 against the outer tube 21 is opposite to the direction described above, in the state in which the outer tube 21 is rotatably driven in the same direction as above by a motor, etc., the supporting member 27 slides outward along the guide groove 25a, and the supporting member 29 slides in the direction of center axis along the guide groove 25b. At that time, the case 20 is driven along the guide rail 5 by the motor 9, and the respective cutter blades 30 stop moving in axial direction at a position facing the prescribed position of the neck 4c after processing and, at this position, the respective cutter blades 30 are driven in radial direction toward the neck 4c as shown in FIG. 6, and the neck 4c is cut at prescribed position. Therefore, during this period, the respective rollers 28 are found in retreated position as shown in FIG. 5.

As described above, according to this embodiment, it becomes possible to perform spinning on the unrotatably supported tube material 4 by driving the roller 28 as working tool in revolution, and perform trimming in succession by cutting the tube material 4 after working at prescribed position by means of the cutter blade 30. Moreover, as neither the tube material 4 nor the connecting rod 41 rotate, it is also possible to easily compose a structure solidly pressing the tube material 4, avoid defects such as displacement of tube material 4, etc. due to rotation, and make accurate positioning.

The roller 28 and the cutter blade 30 may take any moving routes if only they can move in radial direction, and their routes may partially overlap. As the second working tool, it is also all right to use cutting tool, grindstone, rolling tool, etc. in place of the cutter blade 30. Furthermore, in place of the roller 28 and the cutter blade 30, a spinning roller (not illustrated) with a large curvature at the portion to be in contact with the tube material 4 and a spinning roller (not illustrated) with a small curvature at the portion to be in contact with the tube material 4 may be used to construct the first and the second working tools. Curvature at the portion to be in contact with the tube material 4 refers to the so-called curvature of radius at the tip R (curvature in the direction parallel to center of axis), and does not mean the diameter at the outer circumference of the roller.

And, while a spinning roller with a large curvature at the portion to be in contact with the tube material 4 is suitable for forming a rough shape with little loss of thickness, a spinning roller with a small curvature at the portion to be in contact with the tube material 4 is suitable for finishing, because it can perform forming by maintaining a high face accuracy of the worked surface.

Figure 7:
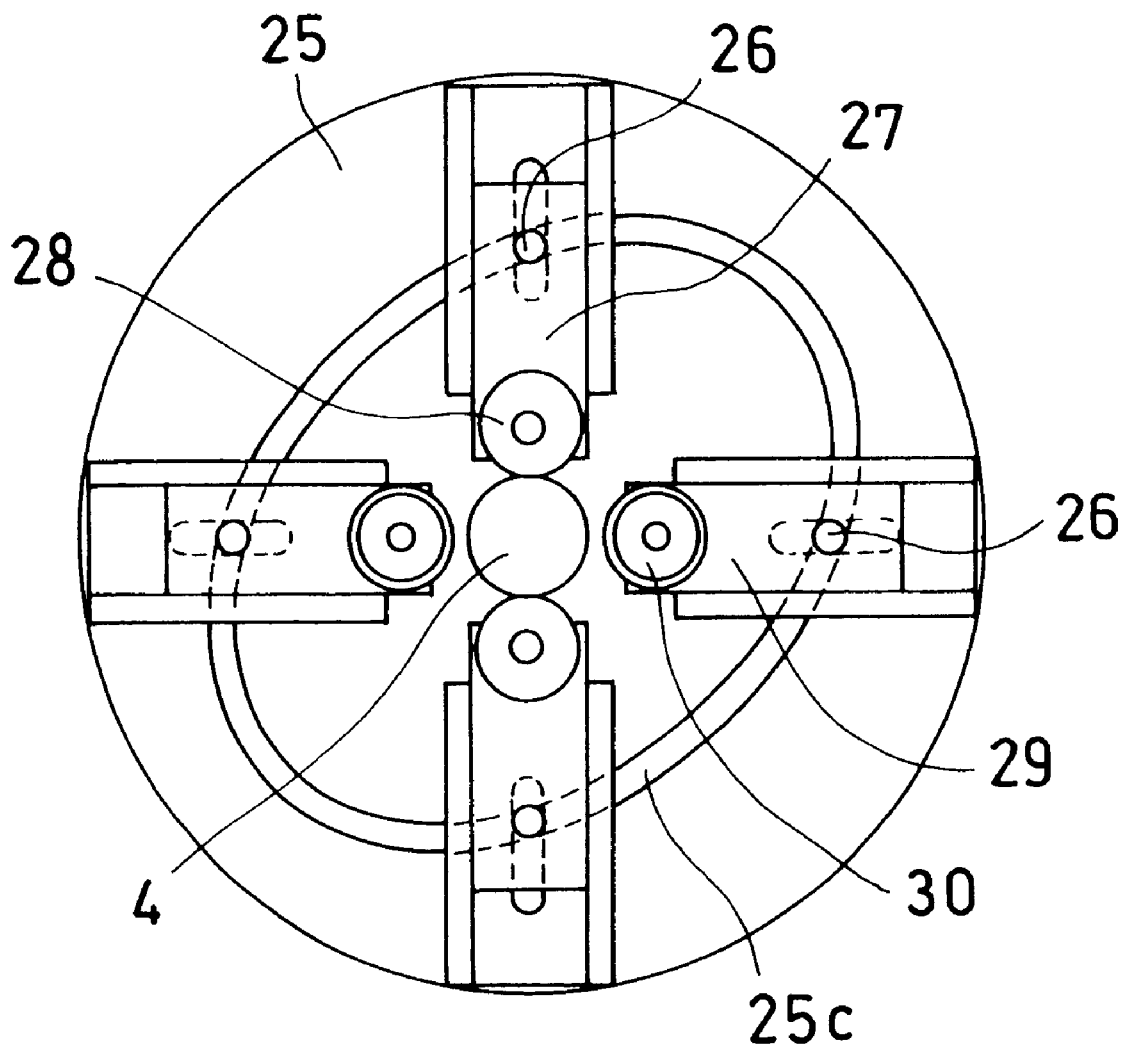
FIG. 7 is a front elevation showing the relation between the roller and the cutter blade in the spinning system of another embodiment according to the present invention.
Figure 8:
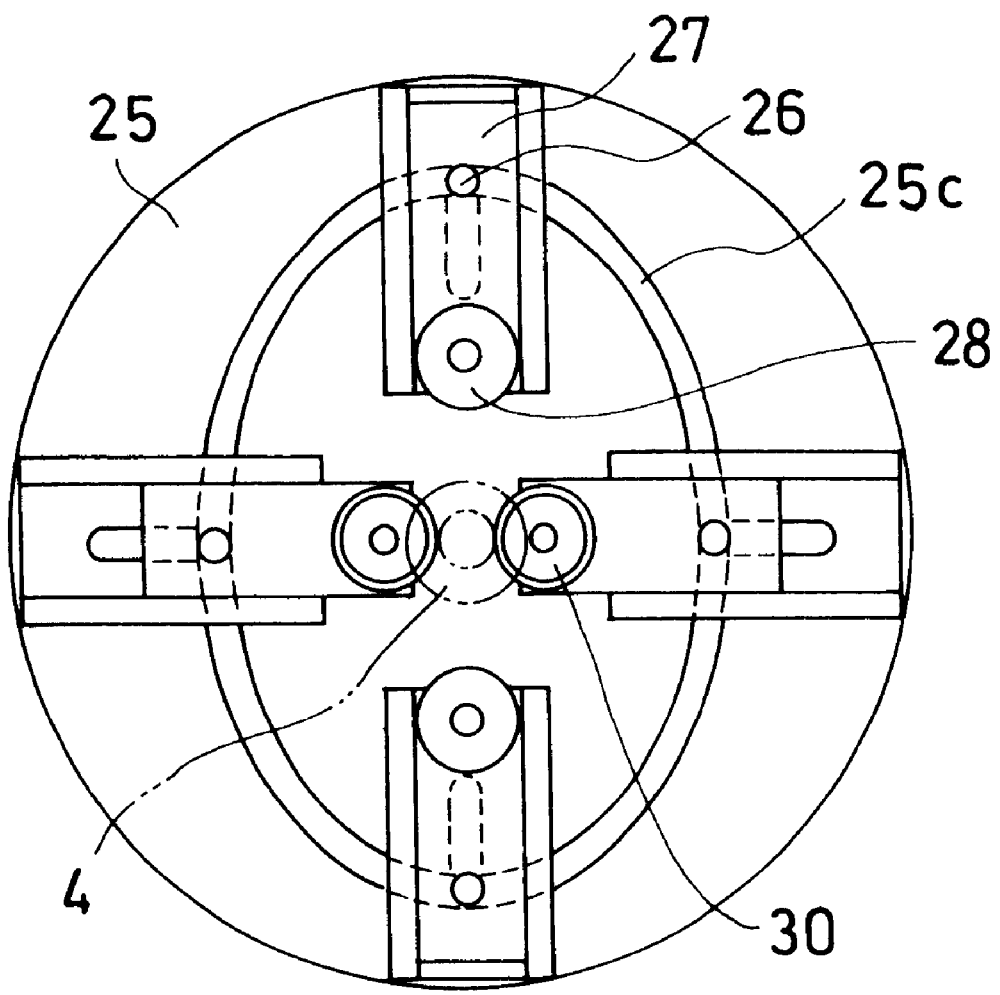
FIG. 8 is a front elevation showing the relation between the roller and the cutter blade in the spinning system of another embodiment according to the present invention.

FIG. 7 and FIG. 8 indicate a situation of spinning by a spinning system according to other embodiment of the present invention, in which the first and the second guide routes of the present invention are formed without a break into a guide groove 25c in elliptic shape, while the construction of other parts is the same as that in the previous embodiment. In this embodiment, the spinning operation can be repeated cyclically in a way to make the roller 28 and the cutter blade 30 move in opposite directions while their relative direction of rotation remains the same, without switching the relative direction of rotation of the second rotor 25 against the first rotor 24.

And, it is possible to perform spinning as shown in FIG. 7, and execute cutting as shown in FIG. 8 after it.

Also in this embodiment, cutting tool, grindstone, etc. may be used in place of the cutter blade 30, as the second working tool. Still more, in place of the roller 28 and the cutter blade 30, a spinning roller (not illustrated) with a large curvature at the portion to be in contact with the tube material 4 and a spinning roller (not illustrated) with a small curvature at the portion to be in contact with the tube material 4 may be used to construct the first and the second working tools.

Figure 9:
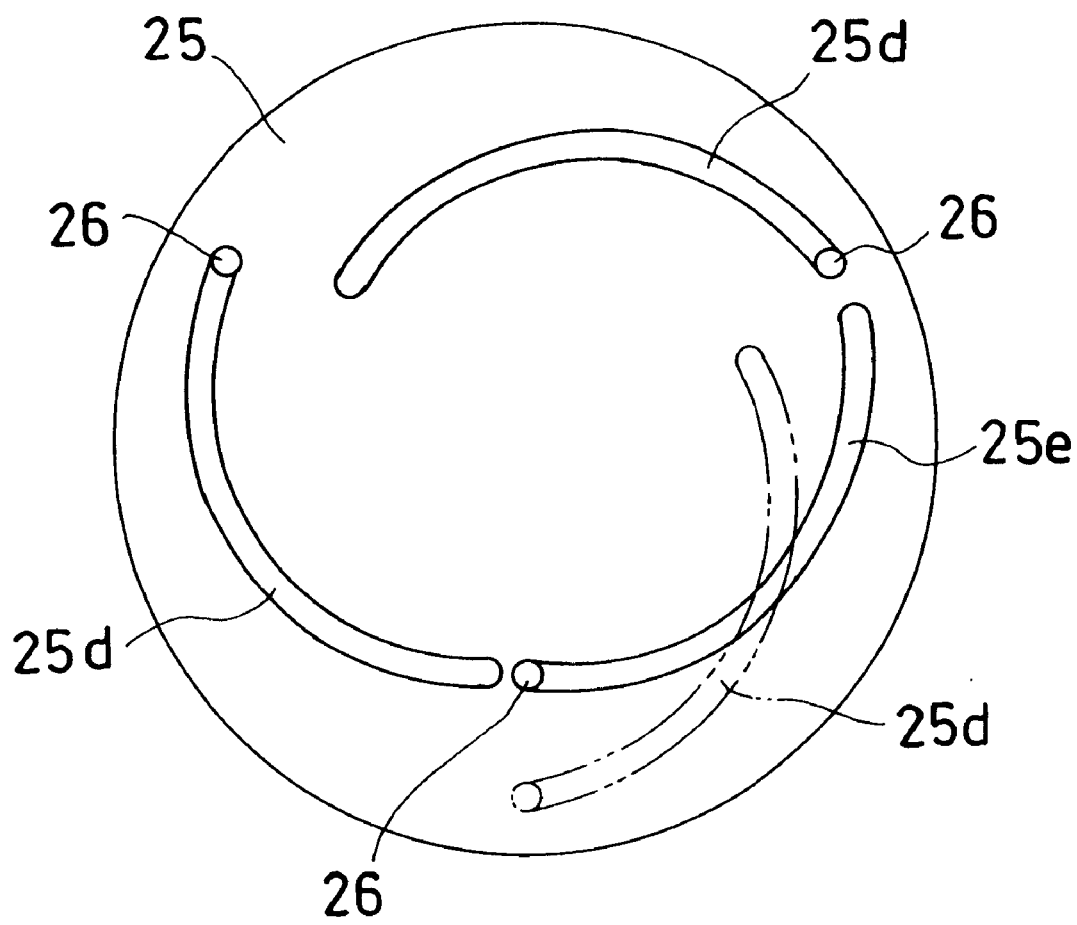
FIG. 9 is a front elevation showing the, second rotor in the spinning system of another embodiment according to the present invention.
Figure 10:
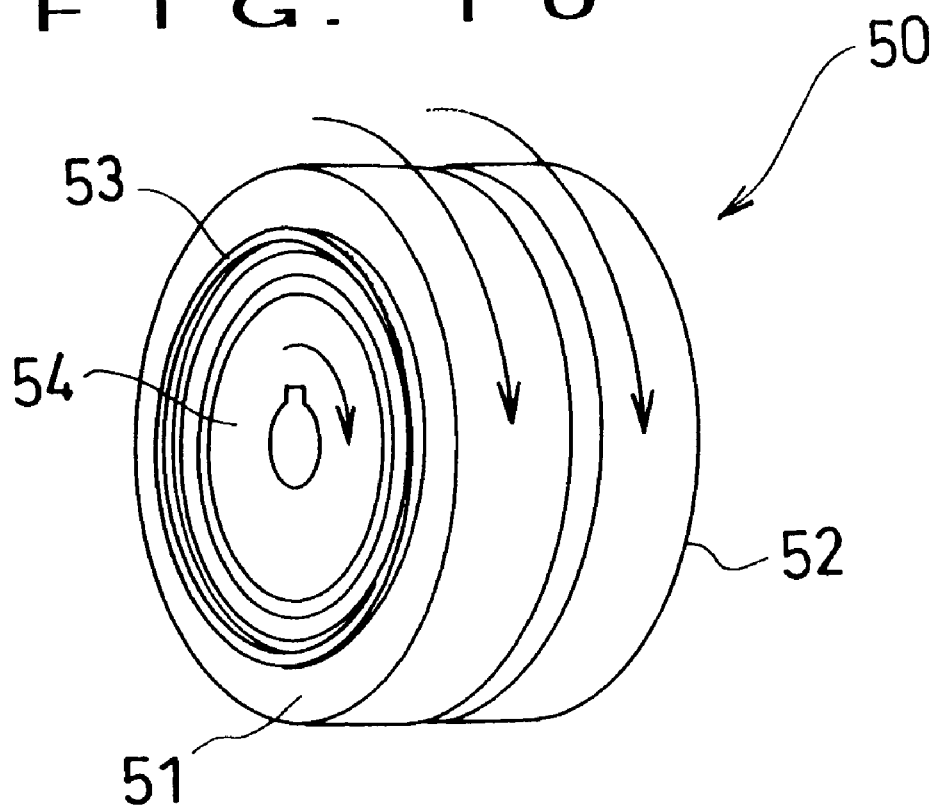
FIG. 10 is a perspective view of the speed change mechanism.
Figure 11:
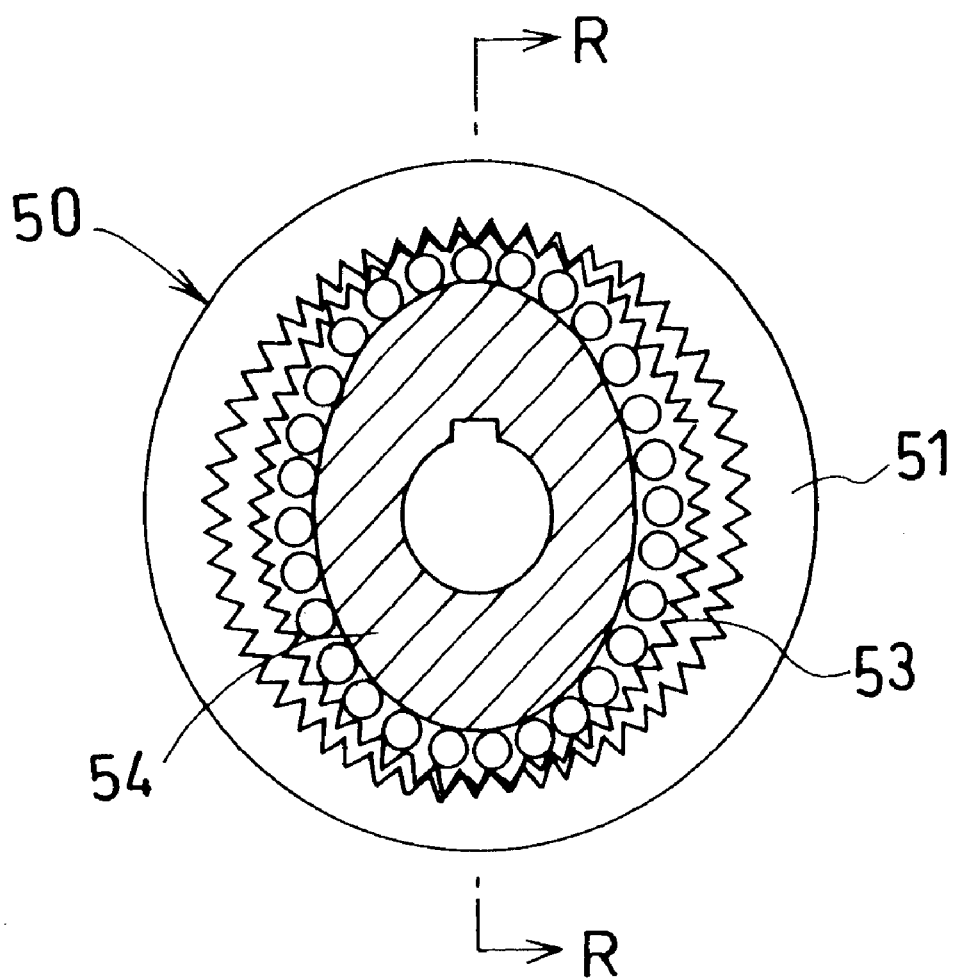
FIG. 11 is a longitudinal sectional view of the speed change mechanism (sectional view at line Q—Q in FIG. 12).
Figure 12:
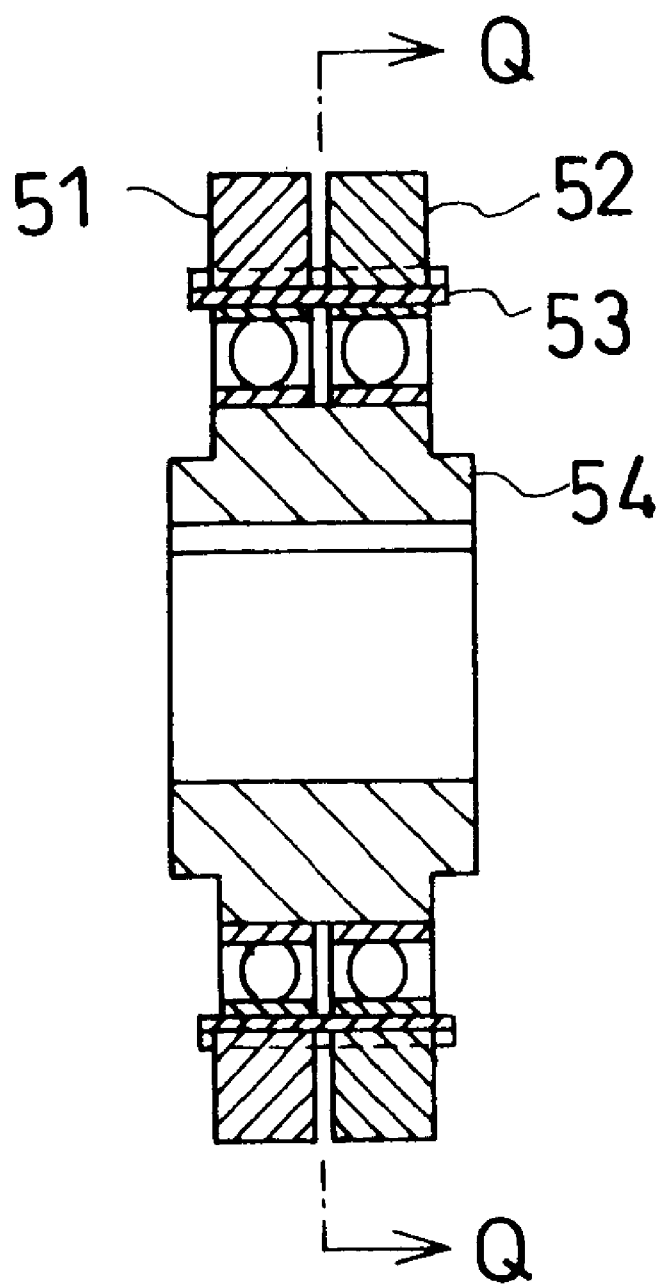
FIG. 12 is a longitudinal sectional view of the speed change mechanism (sectional view at line R—R in FIG. 11).
Figure 13:
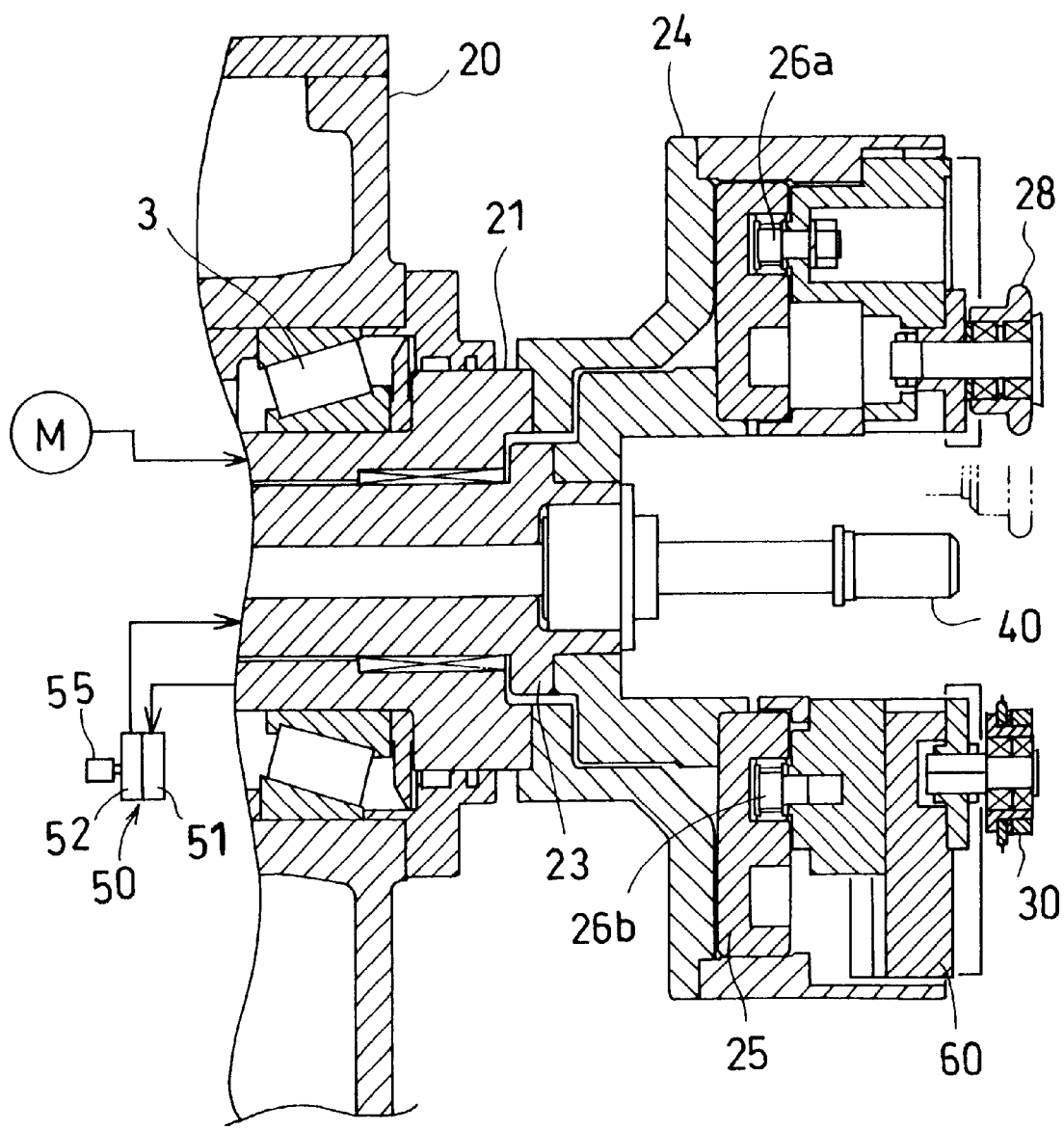
FIG. 13 is a longitudinal sectional view of the main part of the speed change mechanism according to another embodiment of the present invention. (sectional view at line P—P in FIG. 14).

FIG. 9 indicates the second rotor 25 of the spinning system according to other embodiment of the present invention, in which the first guide route of the present invention is formed with 2 guide grooves 25d, while the second guide route is formed with a single guide groove 25e, the guide groove 25e being formed in a way to guide in the opposite direction against the guide groove 25d indicated with a two-dot chain line. And, rollers (not illustrated) are rotatably supported respectively by 2 supporting members (not illustrated) moving along the guide groove 25d, and one cutter blade (not illustrated) is rotatably supported by one supporting member (not illustrated) moving along the guide groove 25e. The construction of other parts is the same as that in the previous embodiment.

While all the above embodiments indicate a state in which the axis of the tapered part 4b and the neck 4c is coaxial with the axis of the tube material 4 during the spinning, it is also possible to either form a tapered part and a neck (not illustrated) along an axis inclined against the axis of the tube material 4 or form a tapered part and a neck along an axis eccentric to the axis of the tube material 4. Yet more, inclined axis and eccentric axis may be combined as required to perform spinning. Spinning comprising such inclined axis and eccentric axis is disclosed in said Japanese Laid-open Patent Publications No. 11-147138 and No. 11-151535, and such working method may be applied to the forming of tapered part and neck. In that case, it is preferable to rotatably support a spinning roller (not illustrated) with a large curvature at the portion to be in contact with the tube material 4 by the supporting member 27 and rotatably support a spinning roller (not illustrated) with a small curvature at the portion to be in contact with the tube material 4 by the supporting member 29, so as to use the former roller in the diameter reducing process of the tube material 4 and use the latter roller in the finishing process of the neck 4c.

FIG. 13 to FIG. 20 indicate the spinning system of other embodiment according to the present invention.

In this spinning system, on the second rotor 25 are formed guide grooves 25f, 25g in spiral shape, as first and second guide routes.

Figure 14:
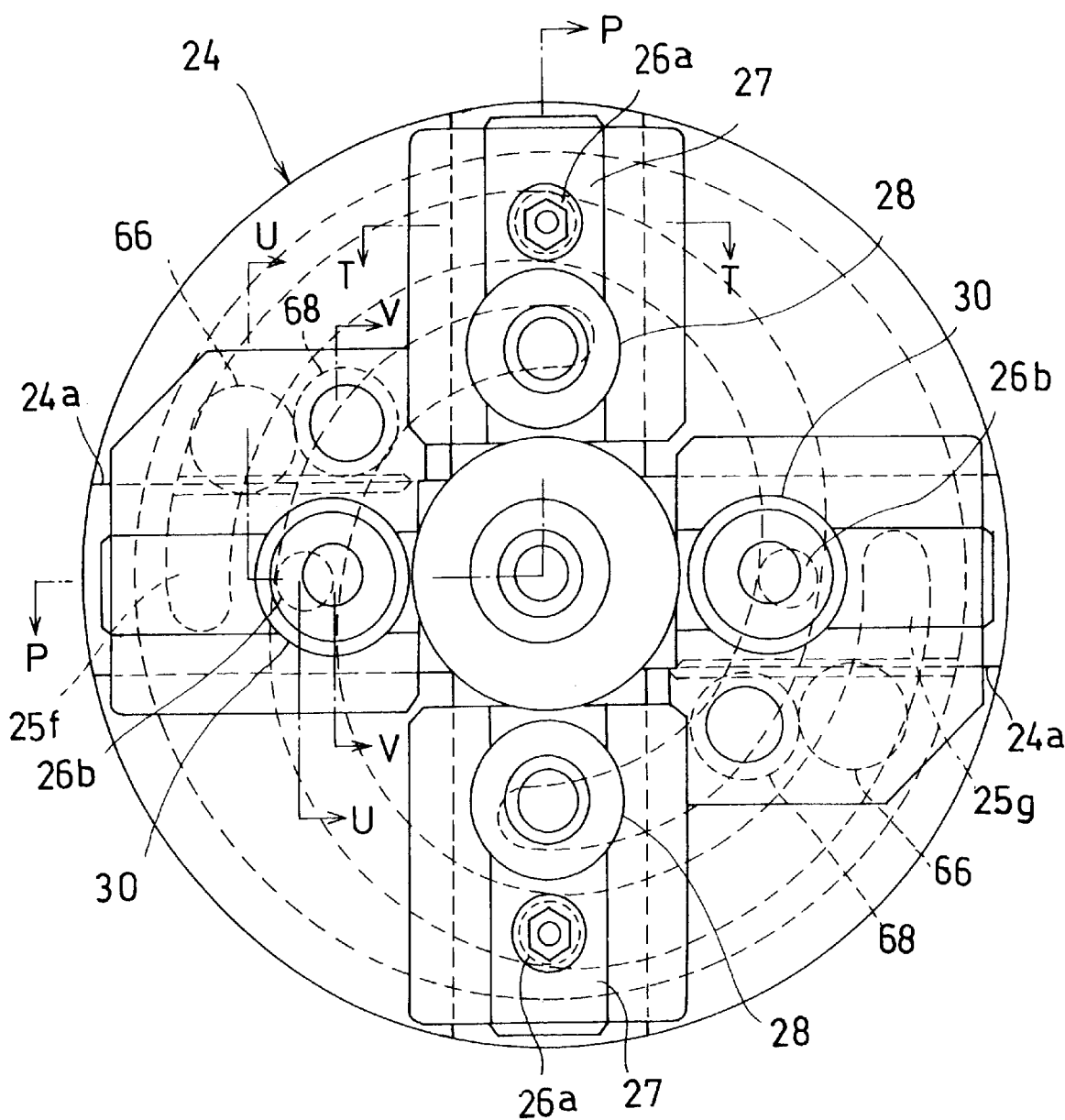
FIG. 14 is a front elevation showing the relation between the roller and the cutter blade in the spinning system of another embodiment according to the present invention.
Figure 15:
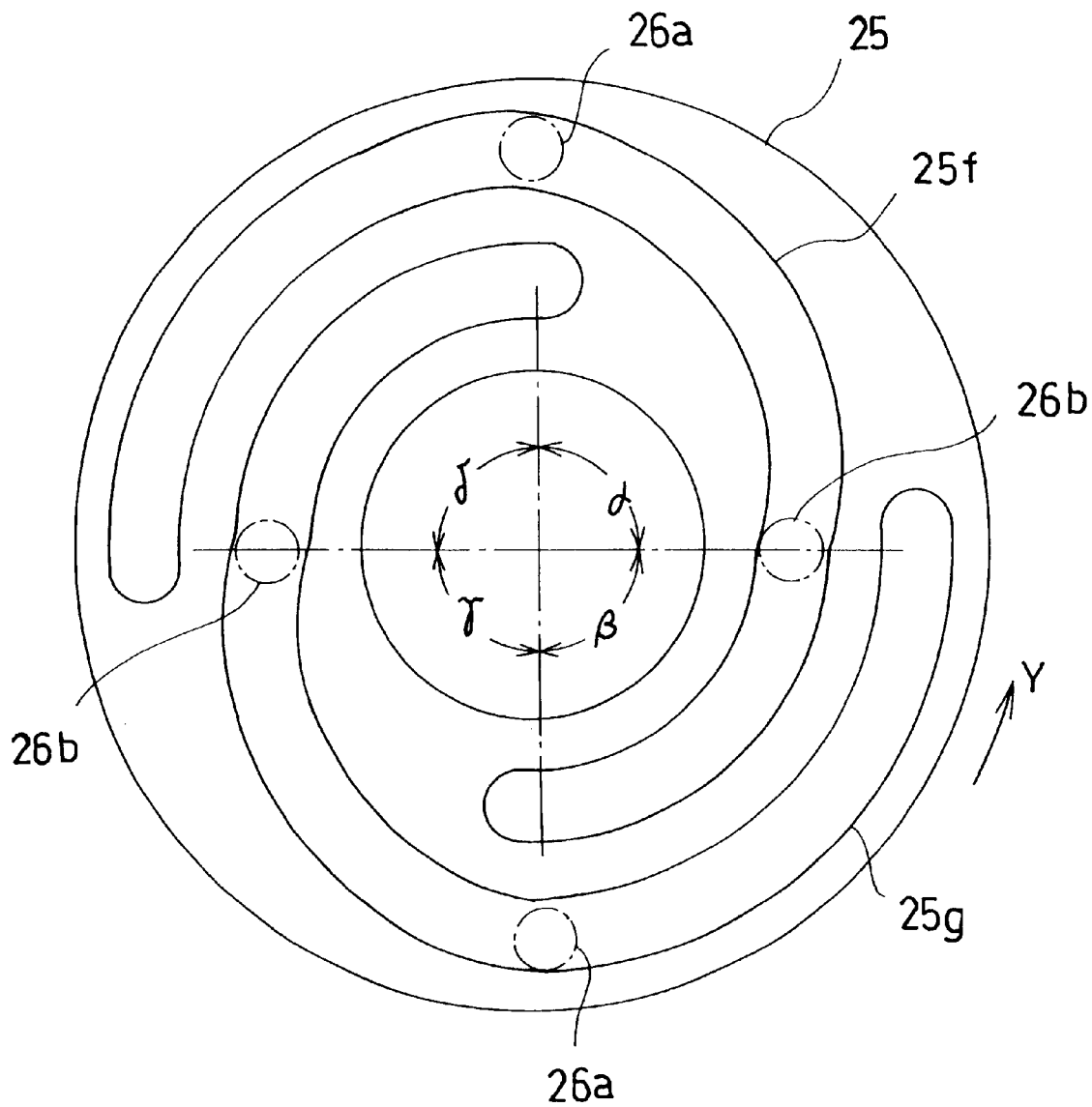
FIG. 15 is a front elevation showing the second rotor in the spinning system of another embodiment according to the present invention.
Figure 16:
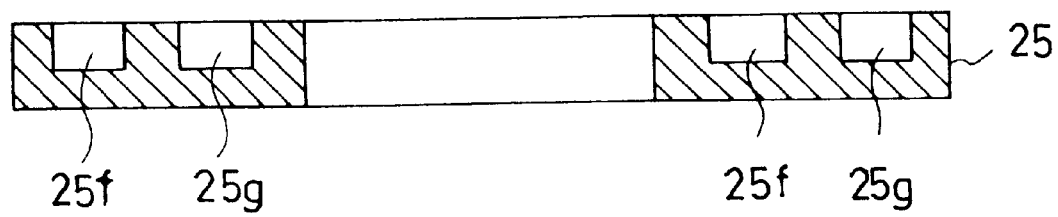
FIG. 16 is a transversal sectional view showing the second rotor in the spinning system of another embodiment according to the present invention.
Figure 17:
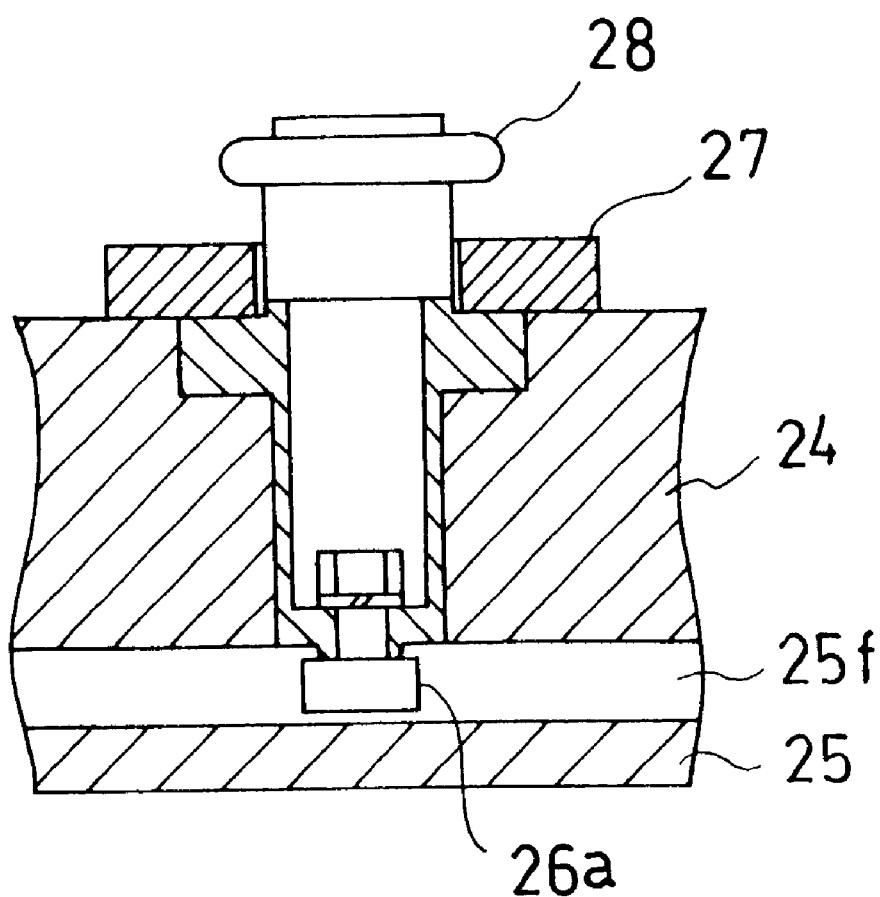
FIG. 17 is a sectional view at line T—T in FIG. 14.

The guide grooves 25f, 25g will be formed over approximately 270° as shown in FIG. 14 and FIG. 15, and, in the case where the entire circumference of the second rotor 25 is divided into 4 equal parts of angles α, β, γ, δ, the areas of angles β, δ will be formed in concentric circles, with one guide groove 25f (25g) as a concentric circle with small diameter and the other guide groove 25g (25f) as a concentric circle with large diameter, while the areas of angles α, γ will be composed of parts with different diameters connecting between the concentric circle with small diameter and the concentric circle with large diameter.

Figure 18:
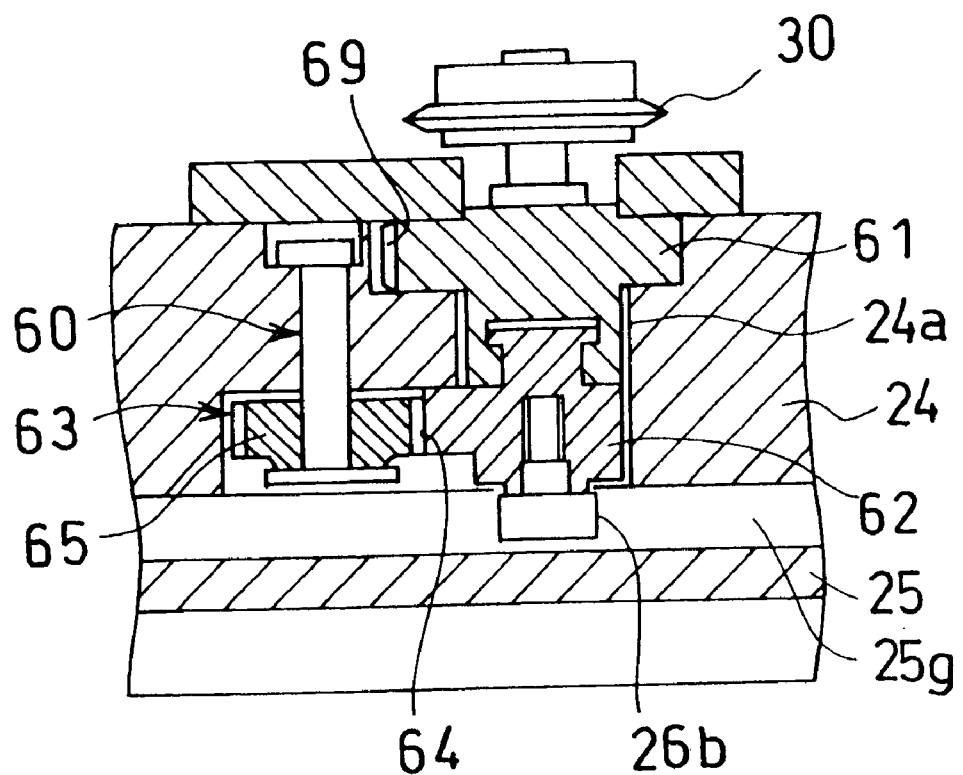
FIG. 18 is a sectional view at line U—U in FIG. 14.
Figure 19:
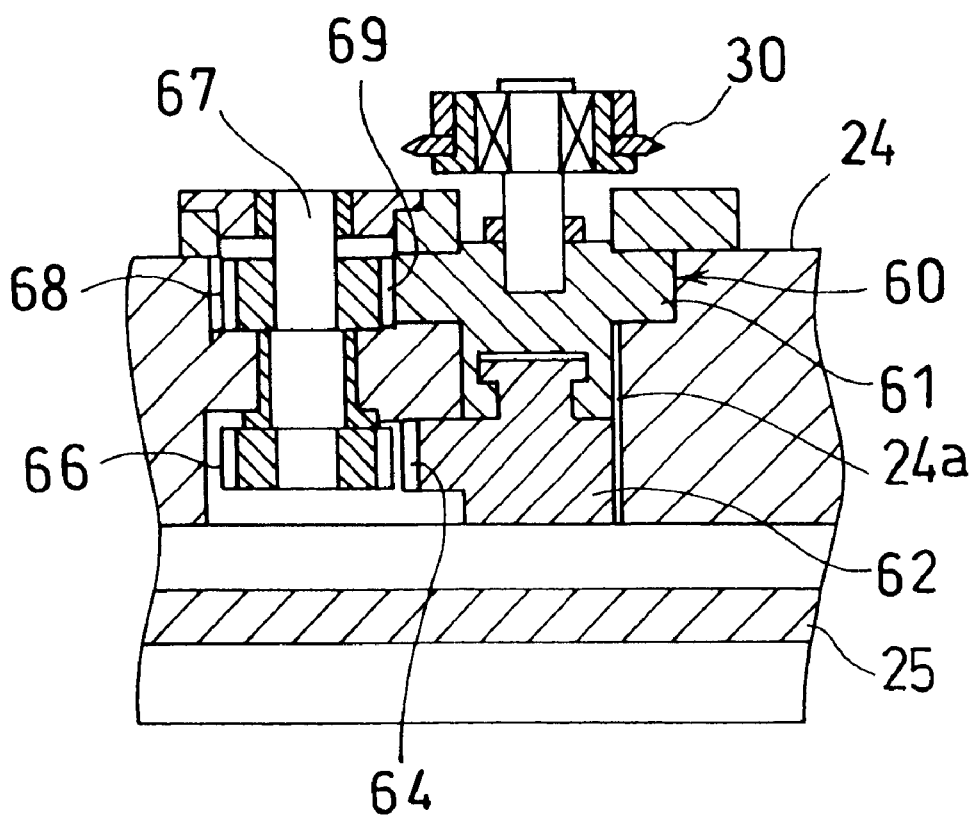
FIG. 19 is a sectional view at line V—V in FIG. 14.
Figure 20:
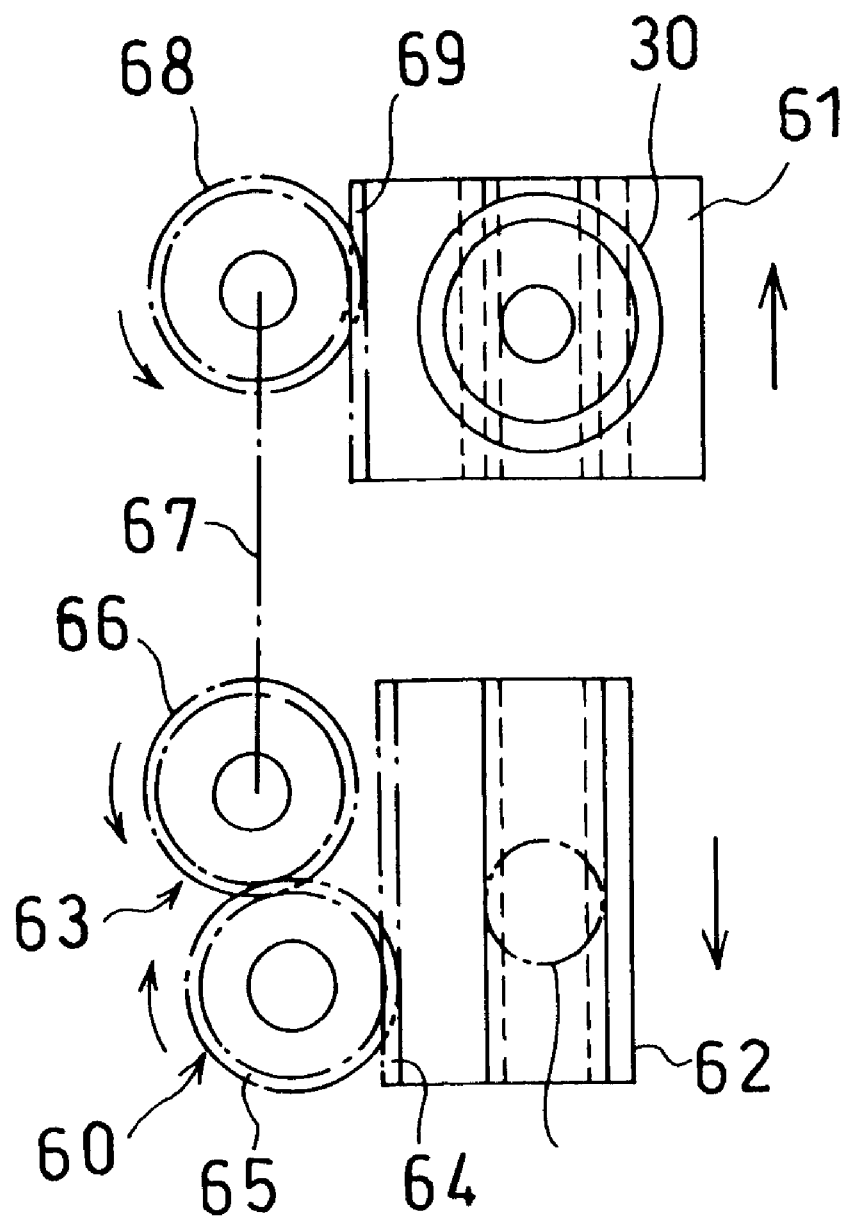
FIG. 20 is an explanatory drawing of the reversing mechanism.

And, either the roller 28 as first working tool or the cutter blade 30 as second working tool, but the cutter blade 30 as second working tool in this embodiment, is provided with a reversing mechanism 60. This reversing mechanism 60 is realized in such a way that, when the guide rollers 26a, 26b move along the guide grooves 25f, 25g or inward in radial direction, for example, the respective cutter blades 30 move in the opposite direction or outward in radial direction, for example, and concrete examples of such movement are indicated in FIG. 18 to FIG. 20.

This reversing mechanism 60 is composed of supporting base 61 of respective cutter blades 30, a bottom moving member 62 slidably supporting this supporting base 61 in radial direction, and a reversing gear member 63. Moreover, the supporting base 61 moves along the guide groove 24a of the first rotor 24, and the reversing gear member 63 is composed of a gear 65 to engage with the rack 64 formed on one side of the bottom moving member 62, an intermediate gear 66 to bite with this gear 65, a drive gear 68 mounted on the same shaft 67 with this intermediate gear 66, and a rack 69 formed on one side of the supporting base 61 biting with this drive gear 68.

As a result, when the respective guide rollers 26a, 26b are found in the positions indicated in FIG. 15, namely in the border between the concentric part and the part with different diameters of the guide grooves 25f, 25g, the respective rollers 28 and cutter blades 30 are in retreated positions.

In the case where the second rotor 25 is turned, from this state, in the direction of arrow mark Y, the respective guide rollers 26a move through the part with different diameters of the guide grooves 25f, 25g inward in radial direction, to perform spinning of the tube material (not illustrated) with the respective rollers 28. In this case, the respective cutter blades 30 are in retreated position, because the respective guide rollers 26b move through the diameter of concentric circle with small diameter.

And, in the case where the second rotor 25 is turned, from this state, and after the above operation, in the direction opposite to the direction of arrow mark Y, to beyond the position indicated in FIG. 15, the respective guide rollers 26b move through the part with different diameters of the guide grooves 25f, 25g inward in radial direction, to cut the end of the tube material (not illustrated) after working, with the respective cutter blades 30. In that case, since the respective guide rollers 26a move through the diameter of the concentric part with large diameter, after moving through the part with different diameters of the guide grooves 25f, 25g outward in radial direction, the respective rollers 28 retreat from the spinning position and remain in the retreated position.

This makes it possible to perform spinning on tube material and, after that, cut the end part after the working.

Other basic constructions and actions of the spinning system of this embodiment are the same as with the spinning system of the embodiment described above.

Explanation has so far be given on the spinning system according to the present invention based on a plurality of embodiments, but the present invention is not restricted to the constructions indicated in the above-described embodiments, and its construction may be changed as required to the extent not deviating from its original purpose.

POSSIBILITY OF INDUSTRIAL APPLICATION

According to the spinning system of the present inventions, it is possible to perform spinning by driving a working tool in revolution on an unrotatably supported member to be machined, and to also perform other work such as cutting, etc. easily after the spinning.

What is claimed is:

1. A spinning system comprising:

a main spindle including an outer tube and an inner tube;

a first rotor provided at an end of one of said outer tube and inner tube so as to be rotatable with said one of said outer tube and inner tube about an axis of said main spindle;

a second rotor provided at an end of the other of said outer tube and inner tube so as to be rotatable with said other of said outer tube and inner tube about the axis of said main spindle, said second rotor being parallel to said first rotor and defining first and second guide routes about the axis of said main spindle;

a first tool supported by said first rotor so as to be movable along said first guide route;

a second tool supported by said first rotor so as to be movable along said second guide route; and a driving device for
(i) rotatably driving said outer tube and said inner tube in the same direction about an axis of a non-rotatably supported member to be machined, and
(ii) rotatably driving said outer tube and said inner tube relative to one another so as to revolve said first tool and said second tool, and so as to produce a difference in rotation between said outer tube and said inner tube such that as said first and second tools revolve, (a) said first tool moves in a radially outward direction along said first guide route while said second tool moves in a radially inward direction along said second guide route, and (b) said first tool moves in a radially inward direction along said first guide route while said second tool moves in a radially outward direction along said second guide route.

2. The spinning system according to claim 1, further comprising a reversing mechanism for one of said first tool and said second tool.

3. The spinning system according to claim 2, wherein portions at both ends of said first and second guide routes are concentric.

4. The spinning system according to claim 3, wherein said first tool comprises a spinning roller and said second tool comprises a cutter blade.

5. The spinning system according to claim 3, wherein said first tool comprises a spinning roller having a large curvature at a portion that is to come into contact with the member to be machined, and said second tool comprises a spinning roller having a small curvature at a portion that is to come into contact with the member to be machined.

6. The spinning system according to claim 2, wherein said first tool comprises a spinning roller and said second tool comprises a cutter blade.

7. The spinning system according to claim 2, wherein said first tool comprises a spinning roller having a large curvature at a portion that is to come into contact with the member to be machined, and said second tool comprises a spinning roller having a small curvature at a portion that is to come into contact with the member to be machined.

8. The spinning system according to claim 1, wherein said first tool comprises a spinning roller and said second tool comprises a cutter blade.

9. The spinning system according to claim 1, wherein said first tool comprises a spinning roller having a large curvature at a portion that is to come into contact with the member to be machined, and said second tool comprises a spinning roller having a small curvature at a portion that is to come into contact with the member to be machined.

10. The spinning system according to claim 1, wherein portions at both ends of said first and second guide routes are concentric.

11. The spinning system according to claim 10, wherein said first tool comprises a spinning roller and said second tool comprises a cutter blade.

12. The spinning system according to claim 10, wherein said first tool comprises a spinning roller having a large curvature at a portion that is to come into contact with the member to be machined, and said second tool comprises a spinning roller having a small curvature at a portion that is to come into contact with the member to be machined.

* * * * *